(12) United States Patent
Niesen et al.

(10) Patent No.: US 11,636,693 B2
(45) Date of Patent: Apr. 25, 2023

(54) ROBUST LANE-BOUNDARY ASSOCIATION FOR ROAD MAP GENERATION

(71) Applicant: QUALCOMM Incorporated, San Diego, CA (US)

(72) Inventors: Urs Niesen, Berkeley Heights, NJ (US); Muryong Kim, Florham Park, NJ (US); Jubin Jose, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/153,704

(22) Filed: Jan. 20, 2021

(65) Prior Publication Data

US 2022/0230017 A1    Jul. 21, 2022

(51) Int. Cl.
*G06V 20/56*    (2022.01)
*G06K 9/62*    (2022.01)

(52) U.S. Cl.
CPC ......... *G06V 20/588* (2022.01); *G06K 9/6215* (2013.01)

(58) Field of Classification Search
CPC ............................ G06V 20/588; G06K 9/6215
See application file for complete search history.

(56) References Cited

U.S. PATENT DOCUMENTS

| | | | | |
|---|---|---|---|---|
| 2007/0069874 A1* | 3/2007 | Huang | ................. | B62D 15/029 340/435 |
| 2008/0109118 A1* | 5/2008 | Schwartz | ............. | G06V 20/588 701/1 |
| 2009/0118994 A1* | 5/2009 | Mori | ...................... | G08G 1/167 701/117 |
| 2010/0110193 A1* | 5/2010 | Kobayashi | ............. | G06V 20/58 348/149 |
| 2012/0062747 A1* | 3/2012 | Zeng | .................... | G06V 20/588 348/149 |
| 2014/0032108 A1* | 1/2014 | Zeng | .................... | B60W 30/12 382/104 |
| 2017/0255843 A1* | 9/2017 | Elwart | .................... | G01S 19/01 |
| 2018/0033148 A1* | 2/2018 | Zheng | ................. | G06V 10/457 |
| 2018/0173229 A1* | 6/2018 | Huang | ................ | G05D 1/0278 |
| 2019/0205664 A1* | 7/2019 | Duan | ...................... | G06T 5/002 |
| 2019/0212747 A1* | 7/2019 | Berkemeier | ......... | G05D 1/0257 |
| 2020/0210696 A1 | 7/2020 | Hou et al. | | |
| 2020/0218907 A1* | 7/2020 | Baik et al. | ........... | G06V 10/454 |
| 2020/0218908 A1 | 7/2020 | Lee et al. | | |
| 2022/0013014 A1* | 1/2022 | Xu | ..................... | G01C 21/3697 |

FOREIGN PATENT DOCUMENTS

CN    106096525    7/2019

OTHER PUBLICATIONS

International Search Report and Written Opinion—PCT/US2021/072637—ISA/EPO—dated Mar. 23, 2022.

\* cited by examiner

*Primary Examiner* — Solomon G Bezuayehu
(74) *Attorney, Agent, or Firm* — Weaver Austin Villeneuve & Sampson LLP/Qualcomm

(57) ABSTRACT

Association algorithms of newly-detected lane boundaries to lane boundaries can be made more robust through the use of generated or "dummy" states. Different types of dummy states can be used to identify outlier/erroneous detections and/or new, legitimate lane boundaries. Therefore, depending on a type of dummy state a newly-detected lane boundary is associated with, the newly-detected lane boundary can be ignored, or the associated dummy state can be added to the lane boundary states of the filter.

30 Claims, 8 Drawing Sheets

ROBUST LANE-BOUNDARY ASSOCIATION FOR ROAD MAP GENERATION

BACKGROUND

1. Field of Invention

The present invention relates generally to the field of electronic vehicle systems, and more specifically to Advanced Driver-Assist Systems (ADAS).

2. Description of Related Art

Vehicle systems such as ADAS often need to identify and track lane boundaries of a road on which the vehicle is traveling. To do so, such systems may capture images of lane markings on the road using a forward-facing camera and associate lane markings detected in the images to corresponding lane boundaries tracked by the vehicle. However, traditional lane-association algorithms, do not effectively ignore markings such as construction markings, tire skid tracks, etc. that are mistakenly identified as lane markings. Further, traditional lane-mapping algorithms are not equipped to effectively handle the addition of new lane boundaries when a new lane boundary is detected.

BRIEF SUMMARY

Embodiments herein allow association algorithms to avoid problems arising from newly-detected lane boundaries through the use of generated or "dummy" states. Different types of dummy states can be used to identify outlier/erroneous detections and/or new, legitimate lane boundaries. Therefore, depending on a type of dummy state a newly-detected lane boundary is associated with, the newly-detected lane boundary can be ignored, or the associated dummy state can be added to the lane boundary states of the filter.

An example method of associating lane boundary measurements to lane boundary states, according to this disclosure, comprises associating lane boundary measurements also comprises obtaining, at a vehicle on a road, a lane boundary measurement indicative of a detected candidate lane boundary along a portion of the road. The method also comprises determining a degree of similarity between the lane boundary measurement and each of a plurality of states, where the plurality of states may comprise one or more lane boundary states descriptive of a respective one or more lane boundaries of the road, and one or more generated states, wherein the one or more generated states are generated for determining the degree of similarity. The method also comprises associating the lane boundary measurement with an associated state, where the associated state may comprise one of the one or more generated states, and the associating is based on the determined degree of similarity between the lane boundary measurement and the associated state. The method also comprises responsive to the associating, adding the associated state to the one or more lane boundary states or disregarding the lane boundary measurement.

An example device, according to this disclosure, comprises memory, sensors, and one or more processing units communicatively coupled with the memory and sensors. The one or more processing units configured to obtain a lane boundary measurement indicative of a detected candidate lane boundary along a portion of a road on which a vehicle is located. The one or more processing units are also configured to determine a degree of similarity between the lane boundary measurement and each of a plurality of states, where the plurality of states may comprise one or more lane boundary states descriptive of a respective one or more lane boundaries of the road, and one or more generated states, wherein the one or more generated states are generated for determining the degree of similarity. The one or more processing units are also configured to associate the lane boundary measurement with an associated state, where the associated state may comprise one of the one or more generated states, and the associating is based on the determined degree of similarity between the lane boundary measurement and the associated state. The one or more processing units are also configured to, responsive to the associating, add the associated state to the one or more lane boundary states or disregard the lane boundary measurement.

Another example device, according to this disclosure, comprises means for obtaining a lane boundary measurement indicative of a detected candidate lane boundary along a portion of a road on which a vehicle is located. The device also comprises means for determining a degree of similarity between the lane boundary measurement and each of a plurality of states, where the plurality of states may comprise one or more lane boundary states descriptive of a respective one or more lane boundaries of the road, and one or more generated states, wherein the one or more generated states are generated for determining the degree of similarity. The device also comprises means for associating the lane boundary measurement with an associated state, where the associated state may comprise one of the one or more generated states, and the associating is based on the determined degree of similarity between the lane boundary measurement and the associated state. The device also comprises means for performing, in response to the associating, adding the associated state to the one or more lane boundary states or disregarding the lane boundary measurement.

An example non-transitory computer-readable medium, according to this disclosure, stores instructions for associating lane boundary measurements to lane boundary states. The instructions comprise code for obtaining, at a vehicle on a road, a lane boundary measurement indicative of a detected candidate lane boundary along a portion of the road. The instructions also comprise code for determining a degree of similarity between the lane boundary measurement and each of a plurality of states, where the plurality of states may comprise one or more lane boundary states descriptive of a respective one or more lane boundaries of the road, and one or more generated states, wherein the one or more generated states are generated for determining purposes of the degree of similarity. The instructions also comprise code for associating the lane boundary measurement with an associated state, where the associated state may comprise one of the one or more generated states, and the associating is based on the determined degree of similarity between the lane boundary measurement and the associated state. The instructions also comprise code for responsive to the associating, adding the associated state to the one or more lane boundary states or disregarding the lane boundary measurement.

BRIEF DESCRIPTION OF THE DRAWINGS

Aspects of the disclosure are illustrated by way of example.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the scope of this disclosure.

As used herein, the term "coordinates frame," "reference frame," "frame of reference," and the like refer to a coordinate frame with which locations of a vehicle and lane boundaries are tracked. Depending on desired functionality, the reference frame may comprise a 2-D coordinate frame (e.g., latitude and longitude on a 2-D map, etc.) or a 3-D coordinate frame (e.g., latitude, longitude, and altitude (LLA) on a 3-D map). Further, according to some embodiments, a position of the vehicle may include orientation information, such as heading. In some embodiments, a position estimate of the vehicle may include an estimate of six degrees of freedom (6DoF) (also known as "pose"), which includes translation (latitude, longitude, and altitude) and orientation (pitch, roll, and yaw) information.

Figure 1:
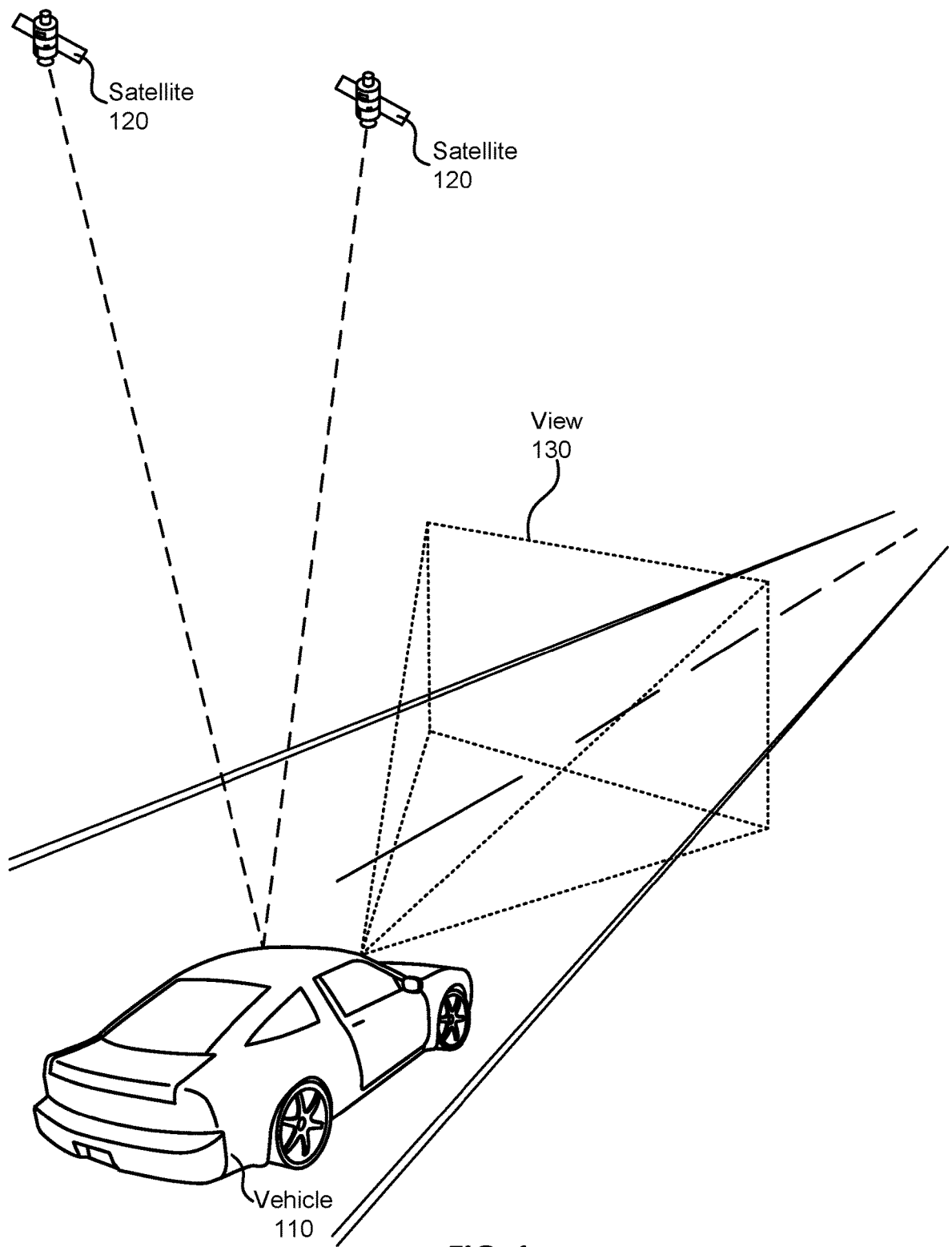
FIG. 1 is a drawing of a perspective view of a vehicle.

FIG. 1 is a simplified perspective view of a vehicle 110, illustrating an environment in which an ADAS system can be used by a vehicle 110. Satellites 120 may provide wireless (e.g., radio frequency (RF)) signals to a Global Navigation Satellite System (GNSS) receiver (e.g., a Global Positioning System (GPS) receiver) on the vehicle 110 for determination of the position (e.g., using absolute or global coordinates) of the vehicle 110. (Of course, although satellites 120 in FIG. 1 are illustrated as relatively close to the vehicle 110 for visual simplicity, it will be understood that satellites 120 will be in orbit around the earth.) The satellites 120 may be part of a one or more constellations of satellites of one or more GNSS systems.

Additionally, one or more cameras may capture images of the vehicle's surroundings. (E.g., a front-facing camera may take images (e.g., video) of a view 130 from the front of the vehicle 110.) Also one or more motion sensors (e.g., accelerometers, gyroscopes, etc.) on and/or in the vehicle 110 can provide motion data indicative of movement of the vehicle 110. Such sensors may be incorporated into inertial measurement unit (IMU). In some embodiments, the image and motion data can be fused to provide additional positioning information. This can then be used to complement and/or substitute (e.g., when needed) GNSS positioning of the vehicle 110, and/or help identify and track lane boundaries on a road along which the vehicle 110 is traveling.

The process of tracking lane boundaries, mapping newly-detected boundaries to these tracked lane boundaries, and positioning the vehicle with respect to the lane boundaries is referred to herein as lane mapping and localization. This can be a primary enabler for several ADAS functionalities for the vehicle 110, such as lane keeping and adaptive cruise control. Lane mapping and localization is often performed by a filter, such as an extended Kalman filter (EKF) or particle filter, that jointly tracks the lane boundaries and the vehicle position. An example system for performing lane mapping and localization is illustrated in FIG. 2.

Figure 2:
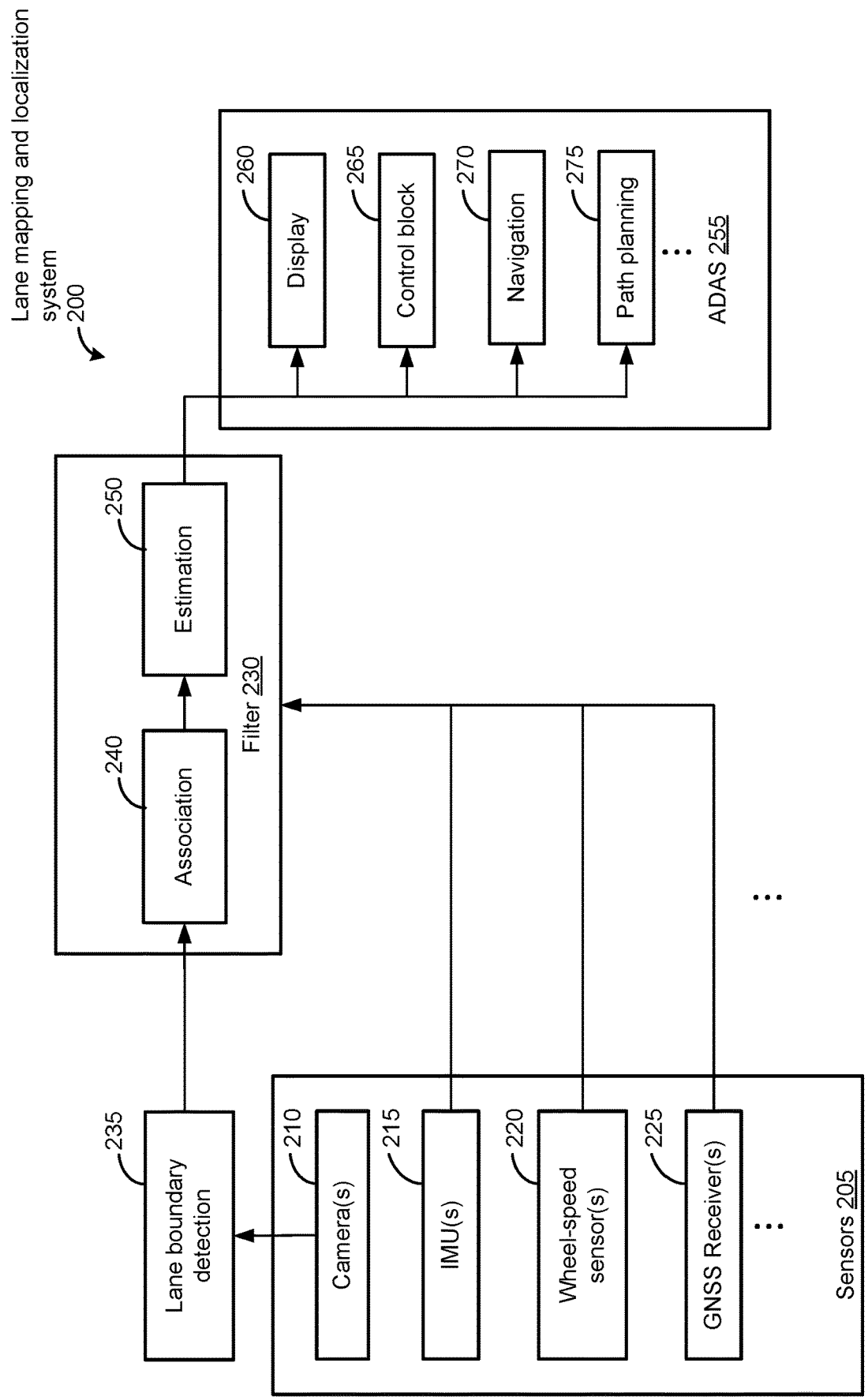
FIG. 2 is a block diagram of a lane mapping and localization system, according to an embodiment.

FIG. 2 is a block diagram of a lane mapping and localization system 200, according to an embodiment. This system 200 may be implemented by various components and systems within the vehicle 110 and may compose part of one or more additional vehicle systems (e.g., vehicle positioning, navigation, and/or automated driving systems, etc.). As with other embodiments herein, this figures provided only as an example and alternative embodiments may rearrange, add, omit, combine, separate, rearrange, and/or otherwise alter the illustrated components.

Here, vehicle sensors 205 may include one or more cameras 210, IMUs 215, wheel speed sensors 220, GNSS receivers 225, and/or other sensors capable of indicating vehicle movement and/or tracking lane boundaries on a road on which the vehicle 110 is traveling. The sensors 205 provide inputs to a filter which, as noted above, can perform the lane mapping and localization. To do so, input from one or more cameras 210 may first be provided to a lane boundary detection function 235, which may be executed by a processing unit and/or specialized circuitry. Using object detection and/or similar algorithms on camera images, the lane boundary detection function 235 can identify candidate lane boundaries, also referred to herein as lane boundary "detections" or "measurements," based on camera images from the camera(s) 210 and provide these candidate lane boundaries to the filter 230.

As noted, the filter 230 may comprise a Kalman filter (e.g., an EKF), particle filter, sliding-window algorithm, or similar filter or algorithm for state estimation, which may be executed (e.g., in software) by a processing unit and/or specialized circuitry. Using the association function 240, the filter 230 can associate the candidate lane boundaries in the input from the lane boundary detection function 235 with estimated lane boundaries currently being tracked. The estimation function 250 of the filter 230 can then update the tracked lane boundaries based on the association and update a position of the vehicle based on input from the sensors 205.

The results of this lane mapping and localization performed by the filter 230 can then be provided to any of a variety of systems within the vehicle 110, including ADAS systems 255. As illustrated, ADAS systems 255 may include, for example, a display 260, a control block 265, navigation block 270, path planning block 275, and/or other functions. The display 260 can, for example, display the positions of the vehicle 110 and/or lane boundaries, to a driver or other vehicle user. The control block 265 can, for example, control automated functions of the vehicle 110, such as lane keeping, adaptive cruise control, automated driving functionality, and/or other functions that may include vehicle-controlled breaking, acceleration, steering, etc. The navigation block 270 may comprise a device or system for providing navigation for the vehicle 110 that may use information regarding the location of the vehicle 110 and/or lane boundaries. The path planning block 275 may comprise a device or system for computing a target path for the vehicle based on a map and current vehicle position and then providing the target path to one or more vehicle control systems.

Figure 3A:
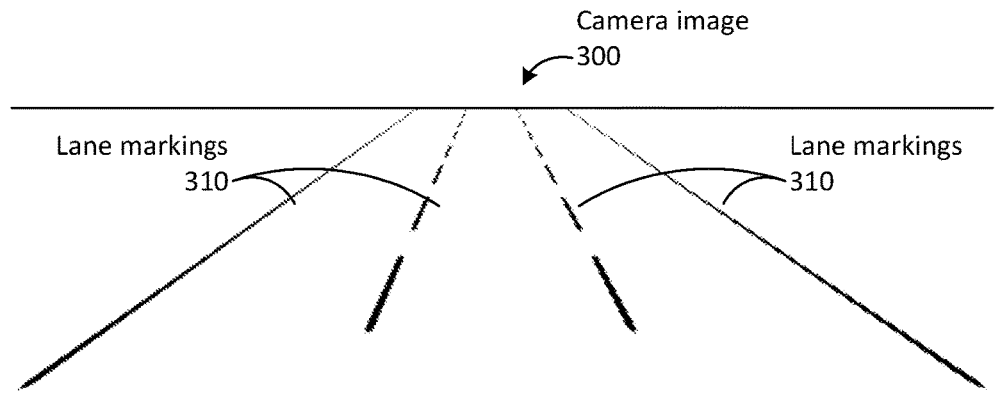
FIGS. 3A-3C diagrams illustrating a process of lane association, according to an embodiment.
Figure 3B:
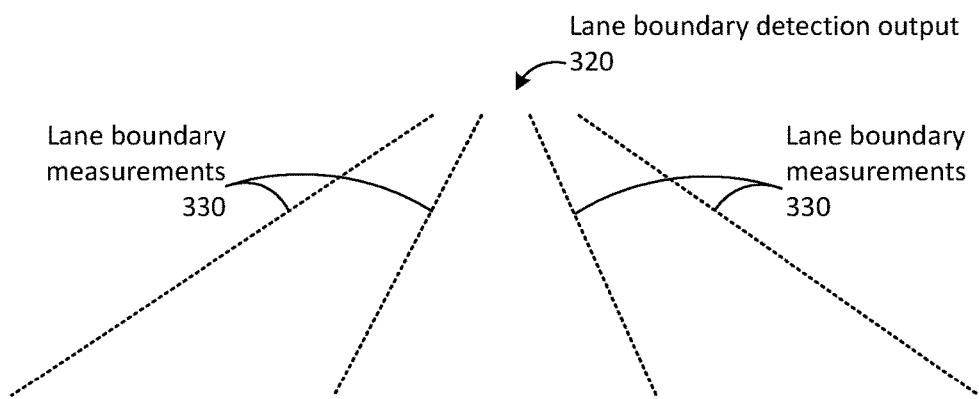
Figure 3C:
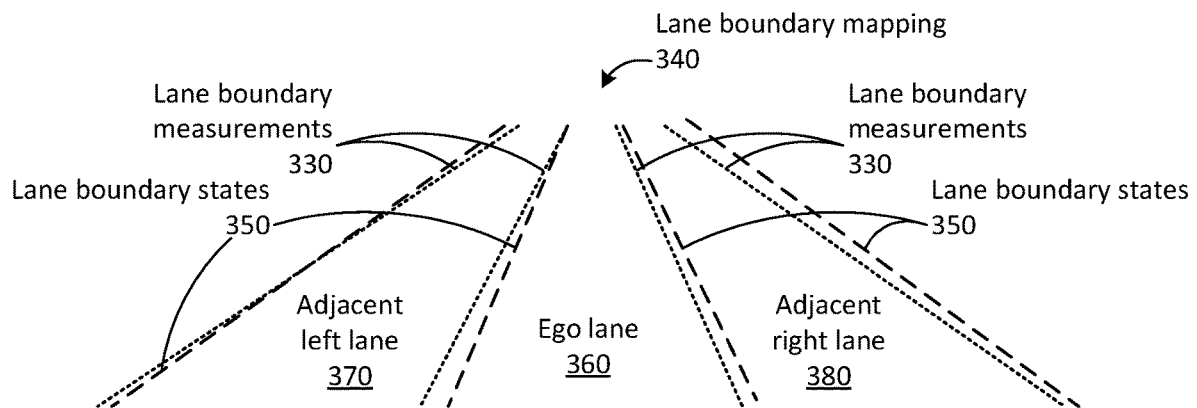

FIGS. 3A-3C are diagrams provided to help illustrate the process of lane association, according to an embodiment. As noted, this may be performed by an association function 240 of the filter 230 illustrated in FIG. 2.

FIG. 3A illustrates a camera image 300. The camera from which the image is obtained may comprise a camera 210 of the sensors 205 illustrated in FIG. 2 and may be a forward-facing camera of the vehicle 110 (e.g., having a view similar to the viewing 130 illustrated in FIG. 1). This can allow the camera to capture images of lane markings 310 indicating lane boundaries on a road along which the vehicle 110 is traveling. Depending on desired functionality, the vehicle camera may capture images or video several times per second (e.g., 30 frames per second (30 fps)). Lane boundary detection (e.g., at block 235 of FIG. 2) may be performed at a similar rate.

FIG. 3B illustrates a lane boundary detection output 320 based on the camera image 300 of FIG. 3A. As previously noted, lane boundary detection may use various identification and/or tracking algorithms to identify lane boundary measurement 330 within the camera image 300. In some embodiments, lane boundary detection output 320 may comprise an identification for each lane boundary measurement 330 (e.g., using a unique identifier such as a number or letter), along with pixels corresponding to each lane boundary measurement 330, within the camera image 300.

Lane boundary measurement 330 may not always accurately correspond with lane markings 310. In some instances, for example, lane markings 310 may be obscured by vehicles or other objects, snow, ice, etc. And therefore the lane boundary detection output 320 may not accurately identify certain lane markings 310. Moreover, in some instances, lane boundary detection may falsely identify other markings on the road (e.g., construction markings, tire skid tracks, etc.) as lane markings 310. As such, lane boundary measurement 330 in the lane boundary detection output 320 may not ultimately be determined to correspond with actual lane boundaries. As such, lane boundary measurement 330 are also referred to herein as candidate lane boundaries or lane boundary candidates.

FIG. 3C shows lane boundary mapping 340 in which lane boundary measurements 330 are associated with (or mapped to) lane boundaries currently tracked in the filter and represented by lane boundary states 350 or filter states. This mapping may occur, as illustrated, in the image plane, based on the camera image 300 by projecting lane boundary states 350 onto the camera image plane (e.g., as shown in FIG. 3C) and comparing the projected lane boundary states to lane boundary measurements 330. (Alternatively, lane boundary measurements 330 may be projected onto another plane/coordinate system for association.) Broadly put, association occurs by matching lane boundary measurements 330 with the most similar lane boundary states 350, based on factors such as distance, orientation, estimation uncertainty etc. Various algorithms may be used to perform this association.

Lane boundary states 350 may be maintained for lane boundaries of the "ego lane" 360 (in which the vehicle is located). When available, lane boundaries may also be maintained for lanes adjacent to the ego lane 360, such as adjacent left lane 370 (the lane immediately adjacent to the ego lane 360 on the left) and adjacent right lane 380 (the lane immediately adjacent to the ego lane 360 on the right). Tracking adjacent lanes can, for example, allow ADAS systems receiving lane boundary mapping 340 as input to determine whether a lane change as possible and (optionally) perform the lane change maneuver. Additional lane boundaries from additional lanes may also be tracked and represented by lane boundary states 350, depending on functions such as desired functionality, number of lanes detected, processing capabilities, etc.

Within the filter, the lane boundary states 350 may describe lane boundaries using a parametric model. That is, each lane boundary state 350 may comprise a vector of values (e.g., scalar states) for one or more of scalar parameters representing curvature, heading, and/or other lane boundary features. The filter can then determine the parameter values that allow the lane boundary state 350 to accurately represent the corresponding lane boundary. (Hence, lane boundary states 350 are also referred to herein as lane boundary estimates.)

One of the difficulties in the implementation of a lane mapping and localization system 200 is ensuring proper association of the lane boundary measurements 330 derived from a new camera image 300 with the correct lane boundary states 350. A wrong association can lead to gross estimation errors or even filter divergence. This, in turn, can lead to erroneous functionality or failure of downstream vehicle systems (e.g., ADAS systems) that may rely on proper lane mapping.

As previously noted, the association task is rendered more difficult by two additional phenomena. The first difficulty arises from erroneous or outlier lane boundary measurements 330, which should be ignored by the filter 230. Such outliers are possible even with sophisticated detection algorithms and can be caused for example by tire marks, faded previous paint markings, cracks in the road surface, and challenging weather conditions such as snow or heavy rain. The second difficulty arises from newly-detected lane boundaries. In this case, the filter 230 must initiate a new lane boundary state 350 rather than associate a newly-detected lane boundary to an existing lane boundary state 350. Such new lane boundaries arise, for example, due to lane splits, exits, the vehicle changing lanes (resulting in the visibility of additional boundaries), etc.

Embodiments provided herein provide for a principled and comprehensive approach to handle this detection-to-state association, accounting for both outliers and new lane-boundary state initiation. To do so, embodiments can make use of "dummy" lane-boundary states. Details are provided hereafter in regard to FIGS. 4-6. First, however, notation is established (in reference to the previously-described figures) to provide a mathematical description of the embodiments.

A lane boundary around the vehicle (e.g., identified by lane markings 310) can be described by a vector x. This vector can, for example, be the offset and the heading of the lane boundary if it is described in two dimensions. Alternatively, according to some embodiments, it may comprise the Plucker line-coordinates of the lane boundary if it is described in three dimensions. Other representations are also possible. The estimate of the lane boundary x inside the filter 230, denoted by $\hat{x}$, comprises the filter state for this lane boundary and is referred to as the lane boundary state 350. If the filter 230 tracks N lane boundaries, then it has N corresponding lane boundary states 350 ($\hat{x}_n$, n=1, 2, ..., N). For each such lane boundary state $\hat{x}_n$ the filter 230 also estimates a corresponding covariance matrix $P_n$.

Given a lane boundary x, the lane boundary detection function 235 (when applied to a camera image) produces a noisy vector of measurements y=ƒ(x)+z. Here ƒ(•) is the measurement function and z is measurement noise assumed to be Gaussian with mean zero and covariance matrix Q. For example, y (corresponding to a lane boundary measurement 330 in FIGS. 3B and 3C) could be a sequence of pixels within the camera image 300 that the lane boundary detection function 235 found within the camera image 300 corresponding to the lane boundary (e.g., as identified by lane markings 310). In general, the lane boundary detection function 235 may produce a number, M, of lane boundary measurements 330 ($y_m$, m=1, 2, ..., M), where each of the M lane boundary measurements 330 corresponds to a distinct lane boundary. That said, there may be instances in which there may be only one or two lane boundary measurements 330.

The association problem is then to associate the M lane-boundary measurements $y_m$ to the N lane-boundary filter states $\hat{x}_n$. In general, M≠N. Some lane boundary measurements 330 may be outliers, meaning that they do not correspond to any real lane boundary and therefore should be discarded. Some lane boundary measurements 330 may correspond to new lane boundaries not yet tracked in the filter and therefore should trigger new states to be added to the filter 230. It can be further noted that, some lane-boundary measurements may not be detected (e.g., could be occluded or otherwise not properly identified by the detection algorithm), which could result in M being less than N at times.

The negative log likelihood of observing measurement $y_m$ from lane boundary state $\hat{x}_n$ can be denoted as $c_{m,n}$ and can be determined (after removing irrelevant constant terms) using the following equation:

$$c_{m,n} = (y_m - f(\hat{x}_n))^T S_n^{-1}(y_m - f(\hat{x}_n)) + \log(\det(S_n)), \quad (1)$$

where $$S_n = F_n P_n F_n^T + Q, \quad (2)$$

and $$F_n = \frac{d}{dx} f(x) \Big|_{x=\hat{x}_n}. \quad (3)$$

$F_n$ is the Jacobian of the measurement function ƒ(•) evaluated at the filter state $\hat{x}_n$. The quantity $c_{m,n}$ can be interpreted as the cost of associating measurement $y_m$ with lane boundary state $\hat{x}_n$.

The minimum cost association is the one that assigns each measurement m to a state n=a(m) such that no state has more than one measurement associated with it, and the total association cost is minimized. The total association cost can be determined as:

$$\Sigma_{m=1}^M c_{m,a(m)}. \quad (4)$$

This minimum cost association algorithm can be found efficiently for example using the Munkres assignment algorithm.

Generally put, therefore, the filter 230 can perform associations of lane boundary measurements with lane boundary states by computing the cost function $c_{m,n}$ for each lane boundary measurement/lane boundary state pair and determining the minimum cost association using term (4) above.

The "cost" of similar lines would be relatively small because the relative difference in lane boundary measurements and lane boundary states (represented by $(y_m - f(\hat{x}_n))^T S_n^{-1}(y_m - f(\hat{x}_n))$ in equation (1)) would be small. Thus, the cost function $c_{m,n}$ can be seen as a measure or degree of similarity between a lane boundary measurement and lane boundary state, and the minimum cost association is used to identify the set of lane boundary measurements most similar to the lane boundary states in the filter 230, where there is a 1:1 mapping of measurements to states. Again, this process can be complicated in cases where one or more lane boundary measurements do not correspond to existing lane boundary states.

Figure 4:
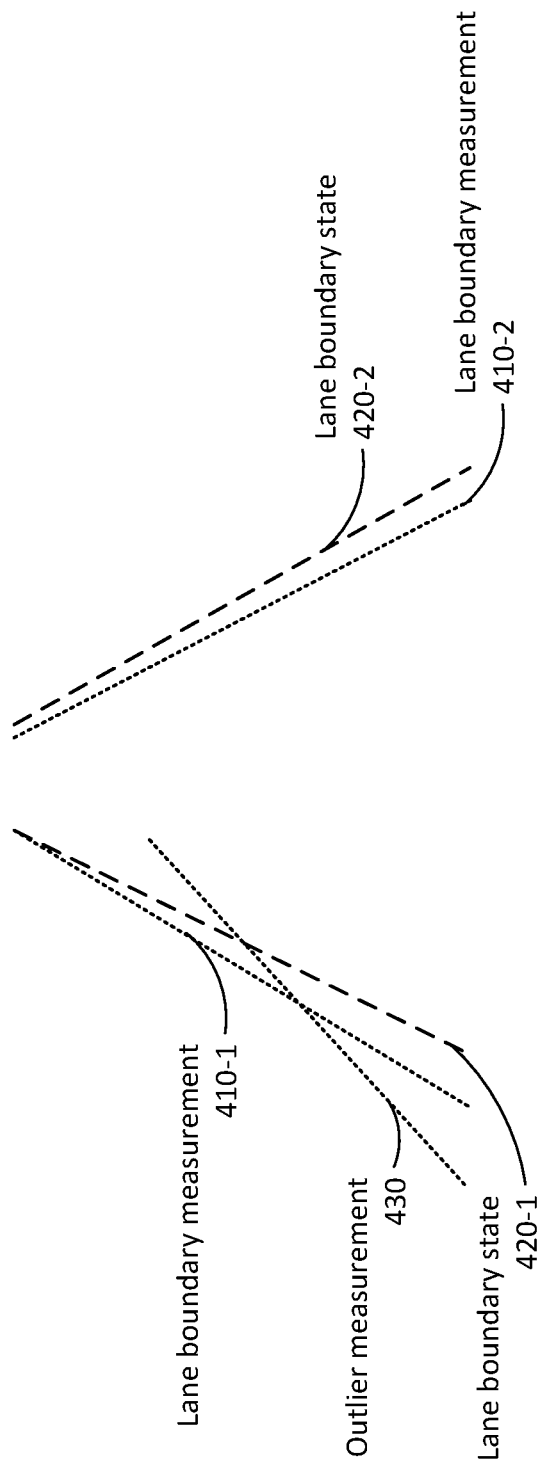
FIGS. 4-6 are diagrams illustrating examples of lane boundary states, lane boundary measurements, and the use of "dummy" states, according to an embodiment.

FIG. 4 is a diagram of a lane boundary mapping input, similar to FIG. 3C, providing an example of a case in which there is an additional measurement. In FIG. 4, there are two lane boundary measurements 410 and two lane boundary states 420, where the lane boundary measurement 410-1 on the left should be associated with the lane boundary state 420-1 on the left, and the lane boundary measurement 410-2 on the right should be associated with the lane boundary state 420-2 on the right. Here, however, the additional measurement comprises an outlier measurement 430. As noted, this outlier measurement 430 may be a result of the lane boundary detection function 235 erroneously identifying a tire track, construction marking, painted-over lane marking, etc. as a legitimate lane marking.

Of course, when receiving the lane boundary measurements 410 and outlier measurement 430 from the lane boundary detection block 235, the filter 230 does not receive any indication that the outlier measurement 430 is an outlier. To allow the association block 240 of the filter 230 to effectively handle outlier measurement 430 by distinguishing the outlier measurement 430 from lane boundary measurements 410 or other legitimate measurements (e.g., new lane boundary measurements), embodiments herein can use outlier dummy states. As used herein, the term "dummy states" are states that are not part of the filter and are only used during the solution of the association problem.

Figure 5:
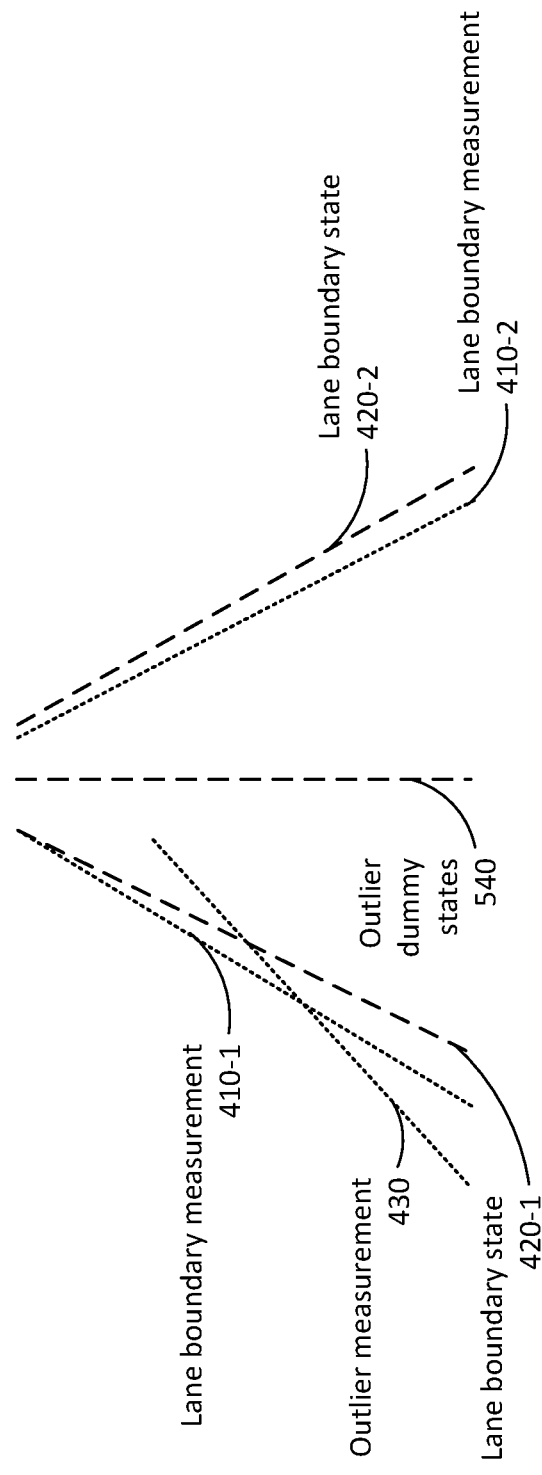

FIG. 5 provides an example of how domain states can be used in the situation illustrated in FIG. 4 to help ensure the removal of the outlier measurement 430. Here, three outlier dummy states 540 are co-located at a middle area within the lane boundary mapping space, away from other lane boundary states 420. (This can ensure that the outlier dummy states 540 are not mapped to lane boundary measurements 410 during the association process.) During association, the lane boundary measurements 410 are correctly associated with corresponding lane boundary states 420, and the outlier measurement 430 is associated with one of the outlier dummy states 540. Because the outlier measurement 430 is associated with the outlier dummy state 540, it is subsequently ignored by the filter 230 (e.g., not used in the estimation block 250 to update lane boundary states 420).

Put more generically, the use of outlier dummy states can be described as follows. For outlier handling, M dummy outlier dummy states can be introduced and processed as lane boundary states $\hat{x}_{N+1}, \ldots, \hat{x}_{N+M}$, where the number M is selected so that there is one outlier dummy state for each lane boundary measurement. (In the example in FIG. 5, therefore, there are three outlier dummy states 540, one for each of the two lane boundary measurements 410 and the outlier measurement 430.) Associated covariance matrices $P_{N+1}, \ldots, P_{N+M}$ for the outlier dummy states can be chosen to be large so that they can be associated with any possible lane measurement. This results in correspondingly large values for $S_n$ in the cost function $c_{m,n}$, resulting in a large value for the term $\log(\det(S_n))$ and a small value for $S_n^{-1}$ for these outlier dummy states. This effectively results in the outlier dummy states having a relatively high base cost that is less affected by the fit of the lane measurement. If the minimum cost association assigns a measurement to an outlier dummy lane boundary, the corresponding measurement is determined to be an outlier and discarded/ignored. This allows outlier dummy states to capture outlying measurements without erroneously capturing valid measurements.

Depending on desired functionality, embodiments may additionally or alternatively use dummy states to initiate new lane boundary states within a filter 230. The process is similar, in ways, to the process of detecting outlier measurements. An example of this process is described hereafter with regard to FIG. 6.

Figure 6:
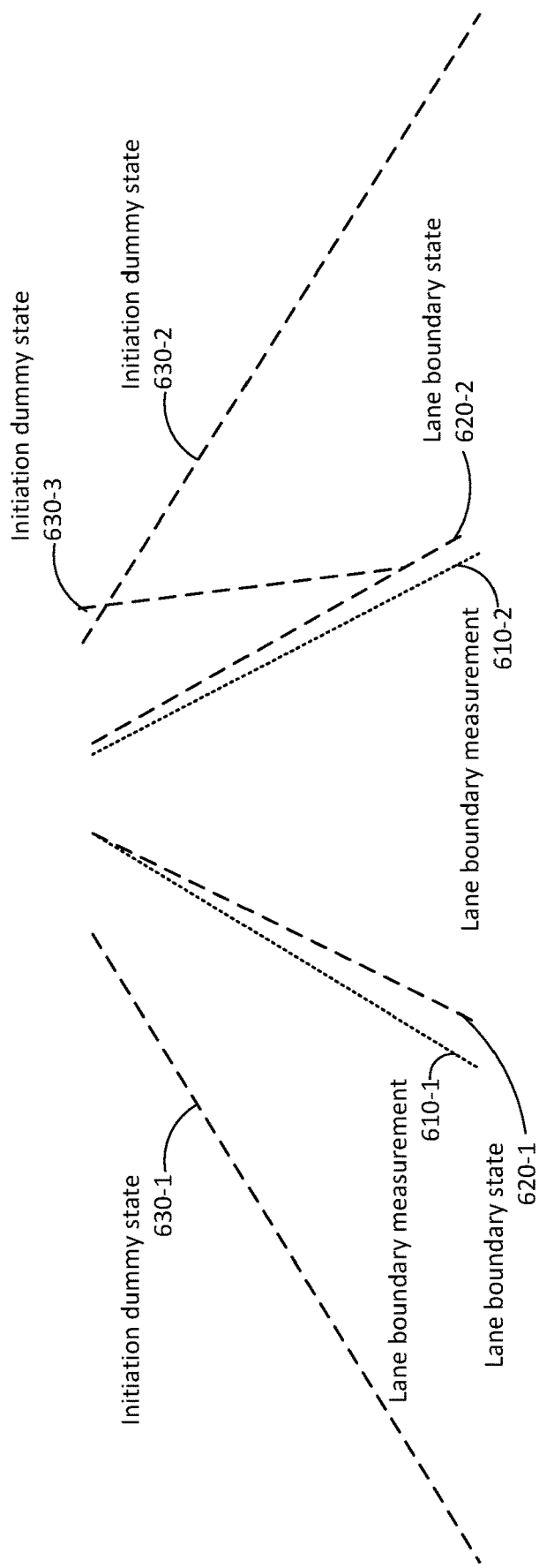

FIG. 6 is a diagram of an example of lane boundary states 620 kept by the filter 230 (with may correspond with lane boundary measurements 610), as well as initiation dummy states 630. The initiation dummy states 630 are located at/near locations where new lane boundary measurements are likely to appear. This helps ensure that if a new lane boundary measurement does appear, it will be mapped to a initiation dummy state 630 during the association process (e.g., the calculation of cost functions and minimum cost association, as previously described).

The number and placement of the initiation dummy states 630 can vary, depending on desired functionality. Initiation dummy states 630-1 and 630-2, for example are located where lane boundaries for adjacent lanes are expected to be detected (which may be based on a known or expected lane width for the road). The initiation dummy state 630-3 is placed on a lane boundary state 620-2 at an angle where an exit lane may be expected. The location an angle of the initiation dummy state 630-3 therefore may be dependent on the type of road (surface street, highway, freeway, etc.). More broadly, the location and placement of the initiation dummy states 630 may be dependent on a variety of factors (road type, known/expected lane width, vehicle speed, camera position, etc.), and may be placed where a new lane boundary is expected (e.g., from a new lane and/or exit lane), where a lane boundary is obscured, and so forth.

Put more generically, use of initiation dummy states can be described as follows. For state initiation handling, K initiation dummy states can be introduced and processed as lane boundary states $\hat{x}_{N+M+1}, \ldots, x_{N+M+K}$. The number K is selected based on any of a variety of factors as noted above and located where new boundaries measurements are likely to appear. The associated covariance matrices $P_{N+M+1}, \ldots, P_{N+M+K}$ are chosen to reflect prior knowledge of where these new lane boundary measurements may appear. If the minimum cost association assigns a measurement to one of these K initiation dummy states, the initiation dummy states is added to the filter 230 as a new lane boundary state.

It can be noted that, some embodiments may be capable of obtaining lane boundary information from a prebuilt high definition (HD) map of lane boundaries, where available. Rather than map generation, this lane boundary information can be used to aid in localization of the vehicle. As such, the lane boundary measurements derived from images of lane markings on the road may be associated with lane boundaries in the HD map. The association techniques described herein may also be applied in such situations.

In these situations, lane boundaries are not being tracked in the filter but instead obtained from the HD map. The measurement function $f(\bullet)$ may be in terms of vehicle pose estimate $\hat{u}$ with covariance P and known lane boundaries $x_n$ from the HD map. In this case, the Jacobian of the measurement function $f(\bullet)$ evaluated at the filter state of vehicle pose $\hat{u}$ is:

$$F_n = \frac{d}{du} f(u, x_n)\bigg|_{u=\hat{u}}, \quad (5)$$

and $$S_n = F_n P F_n^T + Q. \quad (6)$$

Dummy lane boundaries may be used for outlier detection and rejection (such as resulting from construction zones or other HD-map errors) in the manner described above. However, there would be no need for new lane initiation.

Figure 7:
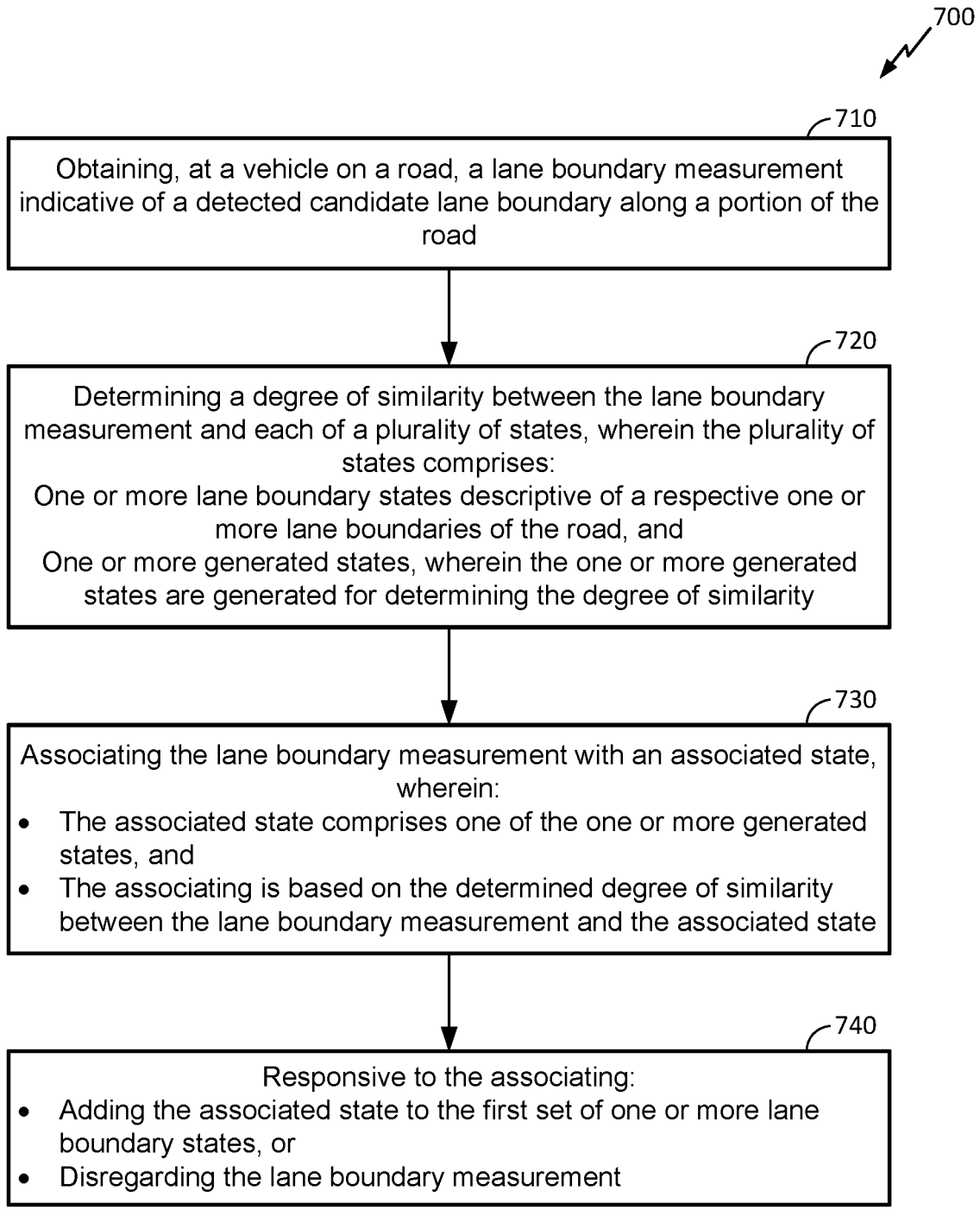
FIG. 7 is a flow diagram of a method of associating lane boundary measurements to lane boundary states, according to embodiment.

FIG. 7 is a flow diagram of a method 700 of associating lane boundary measurements to lane boundary states, according to an embodiment. Alternative embodiments may perform functions in alternative order, combine, separate, and/or rearrange the functions illustrated in the blocks of FIG. 7, and/or perform functions in parallel, depending on desired functionality. A person of ordinary skill in the art will appreciate such variations. Means for performing the functionality of one or more blocks illustrated in FIG. 7 can include, for example, a filter 230. As noted, the filter 230 may comprise a Kalman filter (e.g., EKF), particle filter, or similar algorithms configured to recursively update state estimates (e.g., lane boundary states) from a sequence of updated data from one or more sensors 205. The filter 230 may be implemented in software and executed by a processing unit and/or other hardware and/or software components of an on-vehicle computer system, such as the mobile computing system 800 of FIG. 8, described in further detail below. Additionally or alternatively, such means may include specialized hardware.

At block 710, the functionality comprises obtaining, at a vehicle on a road, a lane boundary measurement indicative of a detected candidate lane boundary along a portion of the road. As described on the embodiments herein, a detected candidate lane boundary may be extracted by a lane boundary detection function from an image of a camera located on the vehicle using object detection and/or similar image processing techniques to determine the detected candidate lane boundary based on one or more lane markings in the image(s). The lane boundary measurement may be obtained from such a lane boundary detection function by, for example, a filter performing the functionality at block 710.

Figure 8:
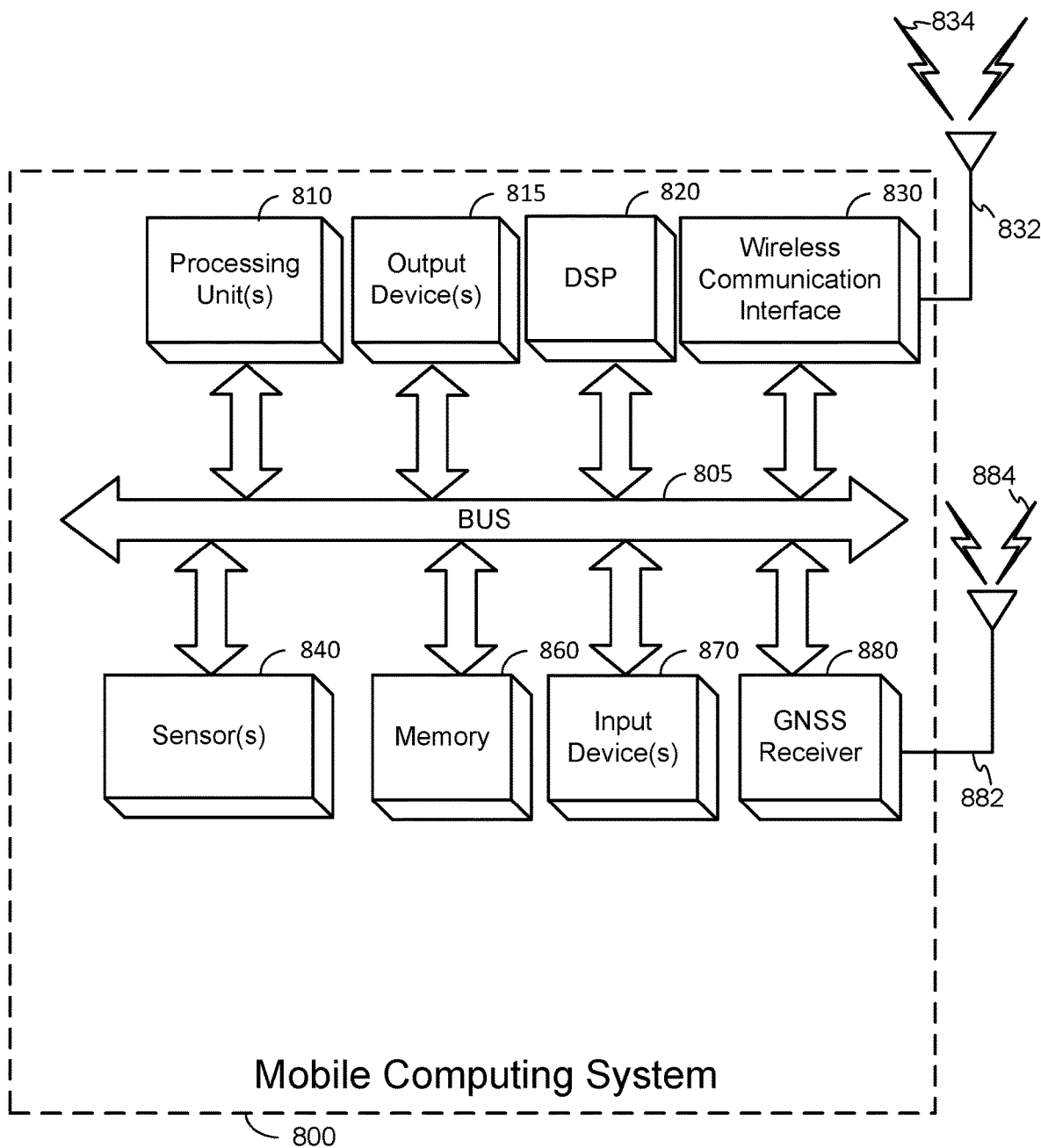
FIG. 8 is a block diagram of an embodiment of a mobile computing system.

Means for performing the functionality of block 710 may include a bus 805, processing unit(s) 810, Digital Signal Processor (DSP) 820, input device(s) 870, working memory 835, and/or other components of a mobile computing system 800 as illustrated in FIG. 8 and described in further detail below.

At block 720, the functionality comprises determining a degree of similarity between the lane boundary measurement and each of a plurality of states, wherein the plurality of states comprises (i) one or more lane boundary states descriptive of a respective one or more lane boundaries of the road, and (ii) one or more generated states, wherein the one or more generated states are generated for determining the degree of similarity. The one or more lane boundary states may comprise filter states. Additionally or alternatively, the one or more lane boundary states descriptive of the respective one or more lane boundaries of the road may be determined from an HD map of the respective one or more lane boundaries of the road. According to some embodiments, the or more lane boundary states may comprise parametric models that describe or approximate the one or more lane boundaries using parameters. In some embodiments, the or more lane boundary states comprise one or more parameters indicative of a heading of the lane boundary, a curvature of the lane boundary, an offset of the lane boundary, or a point on the lane boundary, or any combination thereof. As indicated in the above-described embodiments, a degree of similarity may comprise a cost function or similar comparison metric, which may compare characteristics like location and/or orientation of the lane boundary measurement and lane boundary states.

Means for performing the functionality of block 720 may include a bus 805, processing unit(s) 810, Digital Signal Processor (DSP) 820, working memory 835, and/or other components of a mobile computing system 800 as illustrated in FIG. 8 and described in further detail below.

At block 730, the functionality comprises associating the lane boundary measurement with an associated state, wherein (i) the associated state comprises one of the one or more generated states, and (ii) the associating is based on the determined degree of similarity between the lane boundary measurement and the associated state. As detailed in the embodiments herein, a minimum cost association algorithm (e.g., Munkres assignment algorithm) can be used, for example, to associate lane boundary measurements with states to find the associations having the minimum total cost. Moreover, the association can result in the lane boundary measurement being associated with a generated (dummy) state, such as an initiation dummy state or an outlier dummy state.

Means for performing the functionality of block 730 may include a bus 805, processing unit(s) 810, Digital Signal Processor (DSP) 820, input device(s) 870, working memory 835, and/or other components of a mobile computing system 800 as illustrated in FIG. 8 and described in further detail below.

At block 740, the functionality comprises, responsive to the associating, (i) adding the associated state to the first set of one or more lane boundary states, or (ii) disregarding the lane boundary measurement. Disregarding the lane boundary measurement may occur when it is associated with an outlier state. Thus, according to some embodiments of the method 700, disregarding the lane boundary measurement is further based on a determination that the associated state comprises a generated outlier state for identifying outlying lane boundary measurements. In such cases, the lane boundary measurement may comprise one of a number of lane boundary measurements, and the one or more generated states may comprise a corresponding number of outlier states, including the generated outlier state, such that the number of outlier states matches the number of lane boundary measurements. Alternatively, adding the associated state to the first set of one or more lane boundary states may occur when the lane boundary measurements associated with an initiation state. Thus, according to some embodiments of the method 700, adding the associated state to the first set of one or more lane boundary states is further based on a determination that the associated state comprises a generated initiation state created for identifying new lane boundaries. In such embodiments, the method may further comprise generating a number of initiation states including the generated initiation state, wherein the number of initiation states is based on a candidate location of an obscured lane boundary, a candidate location of a new lane boundary formed by a new lane on the road, or a candidate location of a new lane boundary formed by an exit on the road, or any combination thereof.

Means for performing the functionality of block 740 may include a bus 805, processing unit(s) 810, Digital Signal Processor (DSP) 820, working memory 835, and/or other components of a mobile computing system 800 as illustrated in FIG. 8 and described in further detail below.

Some embodiments may further comprise providing an output to a device or system. For example, according to some embodiments, the method 700 may further comprise providing an output based on the adding the associated state to the first set of one or more lane boundary states or the disregarding the lane boundary measurement. Providing the output may comprise providing an output to an Advanced Driver-Assist System (ADAS) of the vehicle, or a user interface of the vehicle, or both. As a person of ordinary skill in the art will appreciate, this output can impact no only the operation of the filter, but, more generally, the operation of the vehicle. More robust lane association can result in more reliable information used by the vehicle, which could result in more robust and reliable automation of vehicle functions.

FIG. 8 is a block diagram of an embodiment of a mobile computing system 800, which may be used to perform some or all of the functionality described in the embodiments herein, including the functionality of one or more of the blocks illustrated in FIG. 7. The mobile computing system 800 may be located on a vehicle and may include some or all of the components of the lane mapping and localization system 200 of FIG. 2. For example, the filtered 230 and lane boundary detection function 235 of FIG. 2 may be executed by processing unit(s) 810 and/or DSP 820; any or all of the sensors 205 may correspond with sensor(s) 840, GNSS receiver 880, and/or input device(s) 870; ADAS 255 may be implemented by processing unit(s) 810 and/or DSP 820, or may be included in the output device(s) 815; and so forth. A person of ordinary skill in the art will appreciate where additional or alternative components of FIG. 2 and FIG. 8 may overlap.

It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner. In addition, it can be noted that components illustrated by FIG. 8 can be localized to a single device and/or distributed among various networked devices, which may be disposed at different physical locations on a vehicle.

The mobile computing system 800 is shown comprising hardware elements that can be electronically/communicatively coupled via a bus 805 (or may otherwise be in communication, as appropriate). The hardware elements may include processing unit(s) 810, which can include without limitation one or more general-purpose processors, one or more special-purpose processors (such as a digital signal processor (DSP), graphical processing unit (GPU), application specific integrated circuit (ASIC), field-programmable gate array (FPGA), and/or the like), and/or other processing structure or means, which can be configured to perform one or more of the methods described herein, including at least a portion of the method described in FIG. 7. The mobile computing system 800 also can include one or more input devices 870, which can include without limitation a CAN bus (and/or another source of data for various vehicle systems), vehicle feedback systems, user input (e.g., a touchscreen display, breaking input, steering input, dials, switches, etc.), and/or the like. The mobile computing system 800 can also include one or more output devices 815, which can include without limitation a display device (e.g., e.g., dash display, infotainment screen, etc.), lights, meters, vehicle automation and/or control systems, and/or the like.

The mobile computing system 800 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile computing system 800 to communicate with other devices as described in the embodiments above. The wireless communication interface 830 may permit data and signaling to be communicated (e.g., transmitted and received) with transmission/reception points (TRPs) of a network, for example, via access points, various base stations, and/or other access node types, and/or other network components, computer systems, and/or any other electronic devices communicatively coupled with TRPs, as described herein.

Communication may be carried out via an applicable communication standard for vehicular commute occasion, such as Vehicle-to-everything (V2X). V2X can include vehicle-to-vehicle (V2V) communication between V2X-capable vehicles, vehicle-to-infrastructure (V2I) communication between the vehicle and infrastructure-based devices (commonly termed roadside units, or roadside units (RSUs)), vehicle-to-person (V2P) communication between vehicles and nearby people (pedestrians, cyclists, and other road users), and the like. Further, V2X can use any of a variety of wireless radio frequency communication technologies. Cellular V2X (CV2X), for example, is a form of V2X that uses cellular-based communication such as long-term evolution (LTE), fifth-generation new radio (5G NR), and/or other cellular technologies in a direct-communication mode as defined by the 3rd Generation Partnership Project (3GPP). In this way, the mobile computing system 800 may comprise a V2X device or V2X user equipment (UE).

The communication by the wireless communication interface 830 can be carried out via one or more wireless communication antenna(s) 832 that send and/or receive wireless signals 834. According to some embodiments, the wireless communication antenna(s) 832 may comprise a plurality of discrete antennas, antenna arrays, or any combination thereof. The antenna(s) 832 may be capable of transmitting and receiving wireless signals using beams (e.g., Tx beams and Rx beams). Beam formation may be performed using digital and/or analog beam formation techniques, with respective digital and/or analog circuitry. The wireless communication interface 830 may include such circuitry.

Depending on desired functionality, the wireless communication interface 830 may comprise a separate receiver and transmitter, or any combination of transceivers, transmitters, and/or receivers to communicate with base stations and other terrestrial transceivers, such as wireless devices and access points. The mobile computing system 800 may communicate with different data networks that may comprise various network types. For example, a Wireless Wide Area Network (WWAN) may be a Code-division multiple access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, wideband CDMA (WCDMA), and so on. CDMA2000 includes IS-95, IS-2000 and/or IS-856 standards. A TDMA network may implement Global System for Mobile Communications (GSM), Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile computing system 800 can further include sensor(s) 840. As previously noted, sensors may include any of the vehicle sensors described herein, including sensors 205 illustrated in FIG. 2 and previously described. Additionally or alternatively, sensor(s) 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile computing system 800 may also include a Global Navigation Satellite System (GNSS) receiver 880 capable of receiving signals 884 from one or more GNSS satellites using an antenna 882 (which could be the same as antenna 832). Positioning based on GNSS signal measurement can be utilized to complement and/or incorporate the techniques described herein. The GNSS receiver 880 can extract a position of the mobile computing system 800, using conventional techniques, from GNSS satellites 120 of a GNSS system, such as GPS, Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 880 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 880 is illustrated in FIG. 8 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 810, DSP 820, and/or a processing unit within the wireless communication interface 830 (e.g., in a modem). A GNSS receiver may optionally also include a positioning engine, which can use GNSS measurements from the measurement engine to determine a position of the GNSS receiver using an EKF, Weighted Least Squares (WLS), a hatch filter, particle filter, or the like. The positioning engine may also be executed by one or more processing units, such as processing unit(s) 810 or DSP 820.

The mobile computing system 800 may further include and/or be in communication with a memory 860. The memory 860 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the mobile computing system 800 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the mobile computing system 800 (and/or processing unit(s) 810 or DSP 820 within mobile computing system 800). In an aspect, then such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of associating lane boundary measurements to lane boundary states, the method comprising: obtaining, at a vehicle on a road, a lane boundary measurement indicative of a detected candidate lane boundary along a portion of the road; determining a degree of similarity between the lane boundary measurement and each of a plurality of states, wherein the plurality of states comprises: one or more lane boundary states descriptive of a respective one or more lane boundaries of the road, and one or more generated states, wherein the one or more generated states are generated for determining the degree of similarity; associating the lane boundary measurement with an associated state, wherein: the associated state comprises one of the one or more generated states, and the associating is based on the determined degree of similarity between the lane boundary measurement and the associated state; and responsive to the associating: adding the associated state to the one or more lane boundary states, or disregarding the lane boundary measurement.

Clause 2. The method of clause 1, wherein disregarding the lane boundary measurement is further based on a determination that the associated state comprises a generated outlier state for identifying outlying lane boundary measurements.

Clause 3. The method of clauses 1 or 2, wherein: the lane boundary measurement comprises one of a number of lane boundary measurements, and the one or more generated states comprise a corresponding number of outlier states, including the generated outlier state, such that the number of outlier states matches the number of lane boundary measurements.

Clause 4. The method of clause 1, wherein adding the associated state to the one or more lane boundary states is further based on a determination that the associated state comprises a generated initiation state created for identifying new lane boundaries.

Clause 5. The method of clauses 1 or 4, further comprising generating a number of initiation states including the generated initiation state, wherein the number of initiation states is based on: a candidate location of an obscured lane boundary, or a candidate location of a new lane boundary formed by a new lane on the road, or a candidate location of a new lane boundary formed by an exit on the road, or any combination thereof.

Clause 6. The method of any of clauses 1-5, wherein the one or more lane boundary states descriptive of the respective one or more lane boundaries of the road are determined from a high definition (HD) map of the respective one or more lane boundaries of the road.

Clause 7. The method of any of clauses 1-6, wherein the detected candidate lane boundary is extracted from an image taken by a camera located on the vehicle.

Clause 8. The method of any of clauses 1-7, further comprising providing an output based on the adding the associated state to the one or more lane boundary states or the disregarding the lane boundary measurement.

Clause 9. The method of any of clauses 1-8, wherein providing the output comprises providing the output to: an Advanced Driver-Assist System (ADAS) of the vehicle, or a user interface of the vehicle, or both.

Clause 10. The method of any of clauses 1-9, wherein the one or more lane boundary states descriptive of a respective one or more lane boundaries of the road comprise one or more parameters indicative of: a heading of the lane boundary, or a curvature of the lane boundary, or an offset of the lane boundary, or a point on the lane boundary, or any combination thereof.

Clause 11. A device comprising: a memory; and one or more processing units communicatively coupled with the memory, the one or more processing units configured to: obtain a lane boundary measurement indicative of a detected candidate lane boundary along a portion of a road on which a vehicle is located; determine a degree of similarity between the lane boundary measurement and each of a plurality of states, wherein the plurality of states comprises: one or more lane boundary states descriptive of a respective one or more lane boundaries of the road, and one or more generated states, wherein the one or more generated states are generated for determining the degree of similarity; associate the lane boundary measurement with an associated state, wherein: the associated state comprises one of the one or more generated states, and the associating is based on the determined degree of similarity between the lane boundary measurement and the associated state; and responsive to the associating: add the associated state to the one or more lane boundary states, or disregard the lane boundary measurement.

Clause 12. The device of clause 11, wherein the one or more processing units are configured to disregard the lane boundary measurement further based on a determination that the associated state comprises a generated outlier state for identifying outlying lane boundary measurements.

Clause 13. The device of clauses 11 or 12, wherein the one or more processing units are configured to determine a number of outlier states, including the generated outlier state, such that a number of outlier states matches a number of lane boundary measurements.

Clause 14. The device of any of clauses 11, wherein the one or more processing units are configured to add the associated state to the one or more lane boundary states further based on a determination that the associated state comprises a generated initiation state created for identifying new lane boundaries.

Clause 15. The device of clauses 11 or 14, wherein the one or more processing units are further configured to generate a number of initiation states including the generated initiation state, wherein the number of initiation states is based on: a candidate location of an obscured lane boundary, or a candidate location of a new lane boundary formed by a new lane on the road, or a candidate location of a new lane boundary formed by an exit on the road, or any combination thereof.

Clause 16. The device of any of clauses 11-15, wherein the one or more processing units are further configured to determine the one or more lane boundary states descriptive of the respective one or more lane boundaries of the road from a high definition (HD) map of the respective one or more lane boundaries of the road.

Clause 17. The device of any of clauses 11-16, wherein the one or more processing units are further configured to extract the detected candidate lane boundary from an image taken by a camera located on the vehicle.

Clause 18. The device of any of clauses 11-17, wherein the one or more processing units are further configured to provide an output based on the adding the associated state to the one or more lane boundary states or the disregarding the lane boundary measurement.

Clause 19. The device of any of clauses 11-18, wherein, to provide the output, the one or more processing units are configured to provide the output to: an Advanced Driver-Assist System (ADAS) of the vehicle, or a user interface of the vehicle, or both.

Clause 20. The device of any of clauses 11-19, wherein the one or more lane boundary states descriptive of a respective one or more lane boundaries of the road comprise one or more parameters indicative of: a heading of the lane boundary, or a curvature of the lane boundary, or an offset of the lane boundary, or a point on the lane boundary, or any combination thereof.

Clause 21. A device comprising: means for obtaining a lane boundary measurement indicative of a detected candidate lane boundary along a portion of a road on which a vehicle is located; means for determining a degree of similarity between the lane boundary measurement and each of a plurality of states, wherein the plurality of states comprises: one or more lane boundary states descriptive of a respective one or more lane boundaries of the road, and one or more generated states, wherein the one or more generated states are generated for determining the degree of similarity; means for associating the lane boundary measurement with an associated state, wherein: the associated state comprises one of the one or more generated states, and the associating is based on the determined degree of similarity between the lane boundary measurement and the associated state; and means for performing, in response to the associating, adding the associated state to the one or more lane boundary states, or disregarding the lane boundary measurement.

Clause 22. The device of clause 21, further comprising means for further basing the disregarding the lane boundary measurement on a determination that the associated state comprises a generated outlier state for identifying outlying lane boundary measurements.

Clause 23. The device of clause 21 or 22, further comprising means for determining a number of outlier states, including the generated outlier state, such that a number of outlier states matches a number of lane boundary measurements.

Clause 24. The device of clause 21, further comprising means for adding the associated state to the one or more lane boundary states further based on a determination that the associated state comprises a generated initiation state created for identifying new lane boundaries.

Clause 25. The device of clauses 21 or 24, further comprising means for generating a number of initiation states including the generated initiation state, wherein the number of initiation states is based on: a candidate location of an obscured lane boundary, or a candidate location of a new lane boundary formed by a new lane on the road, or a candidate location of a new lane boundary formed by an exit on the road, or any combination thereof.

Clause 26. The device of any of clauses 21-25, further comprising means for determining the one or more lane boundary states descriptive of the respective one or more lane boundaries of the road from a high definition (HD) map of the respective one or more lane boundaries of the road.

Clause 27. The device of any of clauses 21-26, wherein the detected candidate lane boundary is extracted from an image taken by a camera located on the vehicle.

Clause 28. The device of any of clauses 21-27, further comprising providing an output based on the adding the associated state to the one or more lane boundary states or the disregarding the lane boundary measurement.

Clause 29. The device of any of clauses 21-28, wherein the one or more lane boundary states descriptive of a respective one or more lane boundaries of the road comprise one or more parameters indicative of: a heading of the lane boundary, or a curvature of the lane boundary, or an offset of the lane boundary, or a point on the lane boundary, or any combination thereof.

Clause 30. A non-transitory computer-readable medium storing instructions for associating lane boundary measurements to lane boundary states, the instructions comprising code for: obtaining, at a vehicle on a road, a lane boundary measurement indicative of a detected candidate lane boundary along a portion of the road; determining a degree of similarity between the lane boundary measurement and each of a plurality of states, wherein the plurality of states comprises: one or more lane boundary states descriptive of a respective one or more lane boundaries of the road, and one or more generated states, wherein the one or more generated states are generated for determining the degree of similarity; associating the lane boundary measurement with an associated state, wherein: the associated state comprises one of the one or more generated states, and the associating is based on the determined degree of similarity between the lane boundary measurement and the associated state; and responsive to the associating: adding the associated state to the one or more lane boundary states, or disregarding the lane boundary measurement.

What is claimed is:

1. A method of associating lane boundary measurements to lane boundary states, the method comprising:
    obtaining, at a vehicle on a road, a lane boundary measurement indicative of a detected candidate lane boundary along a portion of the road;
    determining a degree of similarity between the lane boundary measurement and each of a plurality of states, wherein the plurality of states comprises:
        one or more lane boundary states descriptive of a respective one or more lane boundaries of the road, and
        one or more generated states, wherein the one or more generated states are generated for determining the degree of similarity;
    associating the lane boundary measurement with an associated state, wherein:
        the associated state comprises one of the one or more generated states, and
        the associating is based on the determined degree of similarity between the lane boundary measurement and the associated state; and
    responsive to the associating:
        adding the associated state to the one or more lane boundary states, or
        disregarding the lane boundary measurement.

2. The method of claim 1, wherein disregarding the lane boundary measurement is further based on a determination that the associated state comprises a generated outlier state for identifying outlying lane boundary measurements.

3. The method of claim 2, wherein:
    the lane boundary measurement comprises one of a number of lane boundary measurements, and
    the one or more generated states comprise a corresponding number of outlier states, including the generated outlier state, such that the number of outlier states matches the number of lane boundary measurements.

4. The method of claim 1, wherein adding the associated state to the one or more lane boundary states is further based on a determination that the associated state comprises a generated initiation state created for identifying new lane boundaries.

5. The method of claim 4, further comprising generating a number of initiation states including the generated initiation state, wherein the number of initiation states is based on:
    a candidate location of an obscured lane boundary, or
    a candidate location of a new lane boundary formed by a new lane on the road, or
    a candidate location of a new lane boundary formed by an exit on the road, or
    any combination thereof.

6. The method of claim 1, wherein the one or more lane boundary states descriptive of the respective one or more lane boundaries of the road are determined from a high definition (HD) map of the respective one or more lane boundaries of the road.

7. The method of claim 1, wherein the detected candidate lane boundary is extracted from an image taken by a camera located on the vehicle.

8. The method of claim 1, further comprising providing an output based on the adding the associated state to the one or more lane boundary states or the disregarding the lane boundary measurement.

9. The method of claim 8, wherein providing the output comprises providing the output to:
an Advanced Driver-Assist System (ADAS) of the vehicle, or
a user interface of the vehicle, or
both.

10. The method of claim 1, wherein the one or more lane boundary states descriptive of a respective one or more lane boundaries of the road comprise one or more parameters indicative of:
a heading of the lane boundary, or
a curvature of the lane boundary, or
an offset of the lane boundary, or
a point on the lane boundary, or
any combination thereof.

11. A device comprising:
a memory;
sensors; and
one or more processing units communicatively coupled with the sensors and the memory, the one or more processing units configured to:
obtain a lane boundary measurement indicative of a detected candidate lane boundary along a portion of a road on which a vehicle is located;
determine a degree of similarity between the lane boundary measurement and each of a plurality of states, wherein the plurality of states comprises:
one or more lane boundary states descriptive of a respective one or more lane boundaries of the road, and
one or more generated states, wherein the one or more generated states are generated for determining the degree of similarity;
associate the lane boundary measurement with an associated state, wherein:
the associated state comprises one of the one or more generated states, and
the associating is based on the determined degree of similarity between the lane boundary measurement and the associated state; and
responsive to the associating:
add the associated state to the one or more lane boundary states, or disregard the lane boundary measurement.

12. The device of claim 11, wherein the one or more processing units are configured to disregard the lane boundary measurement further based on a determination that the associated state comprises a generated outlier state for identifying outlying lane boundary measurements.

13. The device of claim 12, wherein the one or more processing units are configured to determine a number of outlier states, including the generated outlier state, such that a number of outlier states matches a number of lane boundary measurements.

14. The device of claim 11, wherein the one or more processing units are configured to add the associated state to the one or more lane boundary states further based on a determination that the associated state comprises a generated initiation state created for identifying new lane boundaries.

15. The device of claim 14, wherein the one or more processing units are further configured to generate a number of initiation states including the generated initiation state, wherein the number of initiation states is based on:
a candidate location of an obscured lane boundary, or
a candidate location of a new lane boundary formed by a new lane on the road, or
a candidate location of a new lane boundary formed by an exit on the road, or
any combination thereof.

16. The device of claim 11, wherein the one or more processing units are further configured to determine the one or more lane boundary states descriptive of the respective one or more lane boundaries of the road from a high definition (HD) map of the respective one or more lane boundaries of the road.

17. The device of claim 11, wherein the sensors comprise a camera located on the vehicle, and wherein the one or more processing units are further configured to extract the detected candidate lane boundary from an image taken by the camera.

18. The device of claim 11, wherein the one or more processing units are further configured to provide an output based on the adding the associated state to the one or more lane boundary states or the disregarding the lane boundary measurement.

19. The device of claim 18, wherein, to provide the output, the one or more processing units are configured to provide the output to:
an Advanced Driver-Assist System (ADAS) of the vehicle, or
a user interface of the vehicle, or
both.

20. The device of claim 11, wherein the one or more lane boundary states descriptive of a respective one or more lane boundaries of the road comprise one or more parameters indicative of:
a heading of the lane boundary, or
a curvature of the lane boundary, or
an offset of the lane boundary, or
a point on the lane boundary, or
any combination thereof.

21. A device comprising:
means for obtaining a lane boundary measurement indicative of a detected candidate lane boundary along a portion of a road on which a vehicle is located;
means for determining a degree of similarity between the lane boundary measurement and each of a plurality of states, wherein the plurality of states comprises:
one or more lane boundary states descriptive of a respective one or more lane boundaries of the road, and
one or more generated states, wherein the one or more generated states are generated for determining the degree of similarity;
means for associating the lane boundary measurement with an associated state, wherein:
the associated state comprises one of the one or more generated states, and
the associating is based on the determined degree of similarity between the lane boundary measurement and the associated state; and
means for performing, in response to the associating,
adding the associated state to the one or more lane boundary states, or
disregarding the lane boundary measurement.

22. The device of claim 21, further comprising means for further basing the disregarding the lane boundary measurement on a determination that the associated state comprises a generated outlier state for identifying outlying lane boundary measurements.

23. The device of claim 22, further comprising means for determining a number of outlier states, including the generated outlier state, such that a number of outlier states matches a number of lane boundary measurements.

24. The device of claim 21, further comprising means for adding the associated state to the one or more lane boundary states further based on a determination that the associated state comprises a generated initiation state created for identifying new lane boundaries.

25. The device of claim 24, further comprising means for generating a number of initiation states including the generated initiation state, wherein the number of initiation states is based on:
- a candidate location of an obscured lane boundary, or
- a candidate location of a new lane boundary formed by a new lane on the road, or
- a candidate location of a new lane boundary formed by an exit on the road, or
- any combination thereof.

26. The device of claim 21, further comprising means for determining the one or more lane boundary states descriptive of the respective one or more lane boundaries of the road from a high definition (HD) map of the respective one or more lane boundaries of the road.

27. The device of claim 21, wherein the detected candidate lane boundary is extracted from an image taken by a camera located on the vehicle.

28. The device of claim 21, further comprising providing an output based on the adding the associated state to the one or more lane boundary states or the disregarding the lane boundary measurement.

29. The device of claim 21, wherein the one or more lane boundary states descriptive of a respective one or more lane boundaries of the road comprise one or more parameters indicative of:
- a heading of the lane boundary, or
- a curvature of the lane boundary, or
- an offset of the lane boundary, or
- a point on the lane boundary, or
- any combination thereof.

30. A non-transitory computer-readable medium storing instructions for associating lane boundary measurements to lane boundary states, the instructions comprising code for:
- obtaining, at a vehicle on a road, a lane boundary measurement indicative of a detected candidate lane boundary along a portion of the road;
- determining a degree of similarity between the lane boundary measurement and each of a plurality of states, wherein the plurality of states comprises:
  - one or more lane boundary states descriptive of a respective one or more lane boundaries of the road, and
  - one or more generated states, wherein the one or more generated states are generated for determining the degree of similarity;
- associating the lane boundary measurement with an associated state, wherein:
  - the associated state comprises one of the one or more generated states, and
  - the associating is based on the determined degree of similarity between the lane boundary measurement and the associated state; and
- responsive to the associating:
  - adding the associated state to the one or more lane boundary states, or disregarding the lane boundary measurement.

* * * * *